(12) United States Patent
Dand

(10) Patent No.: US 10,114,543 B2
(45) Date of Patent: Oct. 30, 2018

(54) GESTURES FOR SHARING DATA BETWEEN DEVICES IN CLOSE PHYSICAL PROXIMITY

(71) Applicant: Amazon Technologies, Inc., Reno, NV (US)

(72) Inventor: Dhairya Dand, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 312 days.

(21) Appl. No.: 14/825,126

(22) Filed: Aug. 12, 2015

(65) Prior Publication Data

US 2017/0046037 A1    Feb. 16, 2017

(51) Int. Cl.
*G06F 3/048* (2013.01)
*G06F 3/0488* (2013.01)
(Continued)

(52) U.S. Cl.
CPC ............ *G06F 3/0488* (2013.01); *G06F 3/041* (2013.01); *G06F 3/0482* (2013.01); *G06F 3/0486* (2013.01); *G06F 3/04817* (2013.01); *G06F 3/04842* (2013.01); *G06F 3/04883* (2013.01); *H04L 67/10* (2013.01); *H04M 1/7253* (2013.01); *G06F 2203/04104* (2013.01); *H04M 2250/22* (2013.01); *H04M 2250/64* (2013.01)

(58) Field of Classification Search
CPC ......... H04L 12/89; H04L 51/20; H04L 51/32; H04L 67/18; H04L 67/104; H04W 4/02; H04W 8/005; H04W 48/10; H04W 48/16; H04W 4/80; H04W 64/00
See application file for complete search history.

(56) References Cited

U.S. PATENT DOCUMENTS

2007/0146347 A1    6/2007  Rosenberg
2008/0209312 A1*   8/2008  Ardiri .............. G06F 17/30882
                                                    715/236
(Continued)

FOREIGN PATENT DOCUMENTS

WO    WO 2013/071140    5/2013

OTHER PUBLICATIONS

Invitation to Pay Additional Fees with Partial Search Report by the International Searching Authority for PCT Application No. PCT/US2016/046631, dated Oct. 28, 2016, 7 pages.

(Continued)

*Primary Examiner* — Claudia Dragoescu
(74) *Attorney, Agent, or Firm* — Polsinelli LLP

(57) ABSTRACT

The subject technology provides embodiments for sending digital content between proximate computing devices. The computing devices may each have varying display characteristics depending on the specifications of the device. A first computing device may display an interface including representations of digital items. A user may perform a gesture on a touch-sensitive display screen on the first computing device, which selects at least one digital item for sharing with another proximate computing device, in physical contact with the first computing device, in a direction of the gesture. Some embodiments further provide sending a digital item to multiple proximate computing devices using a multi-touch gesture. The multiple proximate computing devices may each have varying display characteristics.

16 Claims, 12 Drawing Sheets

(51) Int. Cl.
*G06F 3/0486* (2013.01)
*H04M 1/725* (2006.01)
*G06F 3/0481* (2013.01)
*G06F 3/041* (2006.01)
*G06F 3/0482* (2013.01)
*G06F 3/0484* (2013.01)
*H04L 29/08* (2006.01)

(56) References Cited

U.S. PATENT DOCUMENTS

| | | |
|---|---|---|
| 2009/0140986 A1 | 6/2009 | Karkkainen et al. |
| 2009/0280824 A1* | 11/2009 | Rautiainen ............... G01S 5/14 455/456.1 |
| 2011/0083111 A1* | 4/2011 | Forutanpour ......... G06F 1/1694 715/863 |
| 2011/0239114 A1 | 9/2011 | Falkenburg et al. |
| 2014/0071069 A1 | 3/2014 | Anderson et al. |
| 2014/0173530 A1* | 6/2014 | Mesguich Havilio ...................... G06F 3/04883 715/863 |
| 2014/0295763 A1* | 10/2014 | Lee ...................... H04W 4/008 455/41.2 |
| 2014/0320542 A1 | 10/2014 | Naruse |
| 2015/0229697 A1 | 8/2015 | Grobelny |
| 2016/0259797 A1* | 9/2016 | Lewis ................. G06F 17/3053 |

OTHER PUBLICATIONS

International Search Report and Written Opinion by the International Searching Authority for the corresponding International Application No. PCT/US2016/046631, dated Dec. 21, 2016, 21 pages.

\* cited by examiner

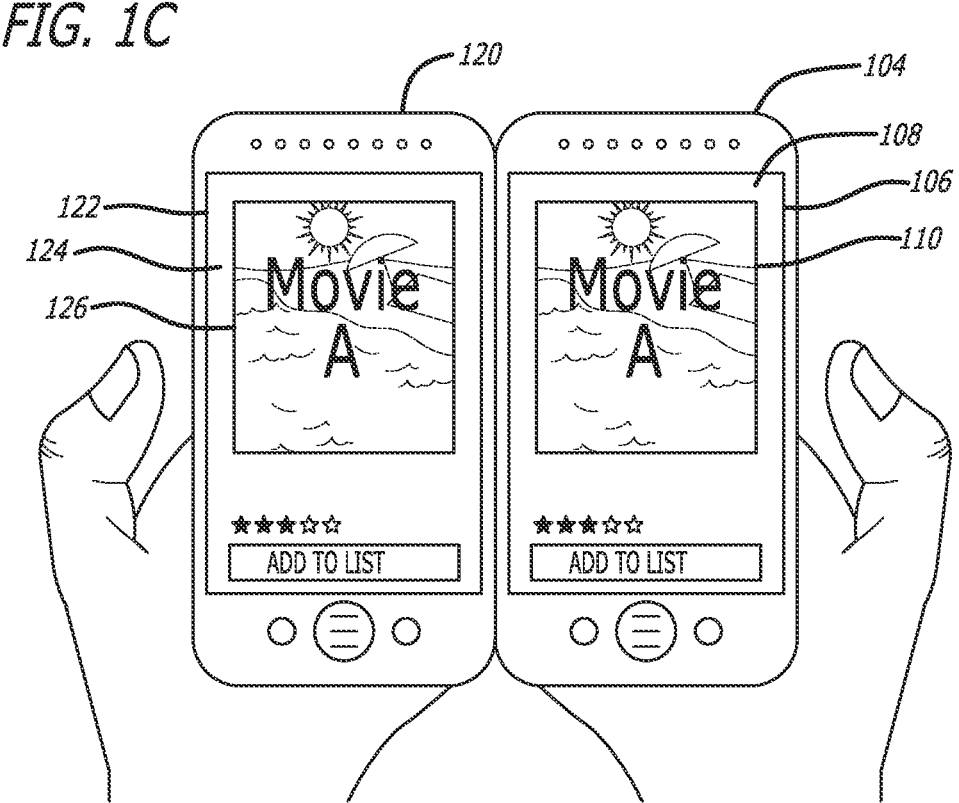

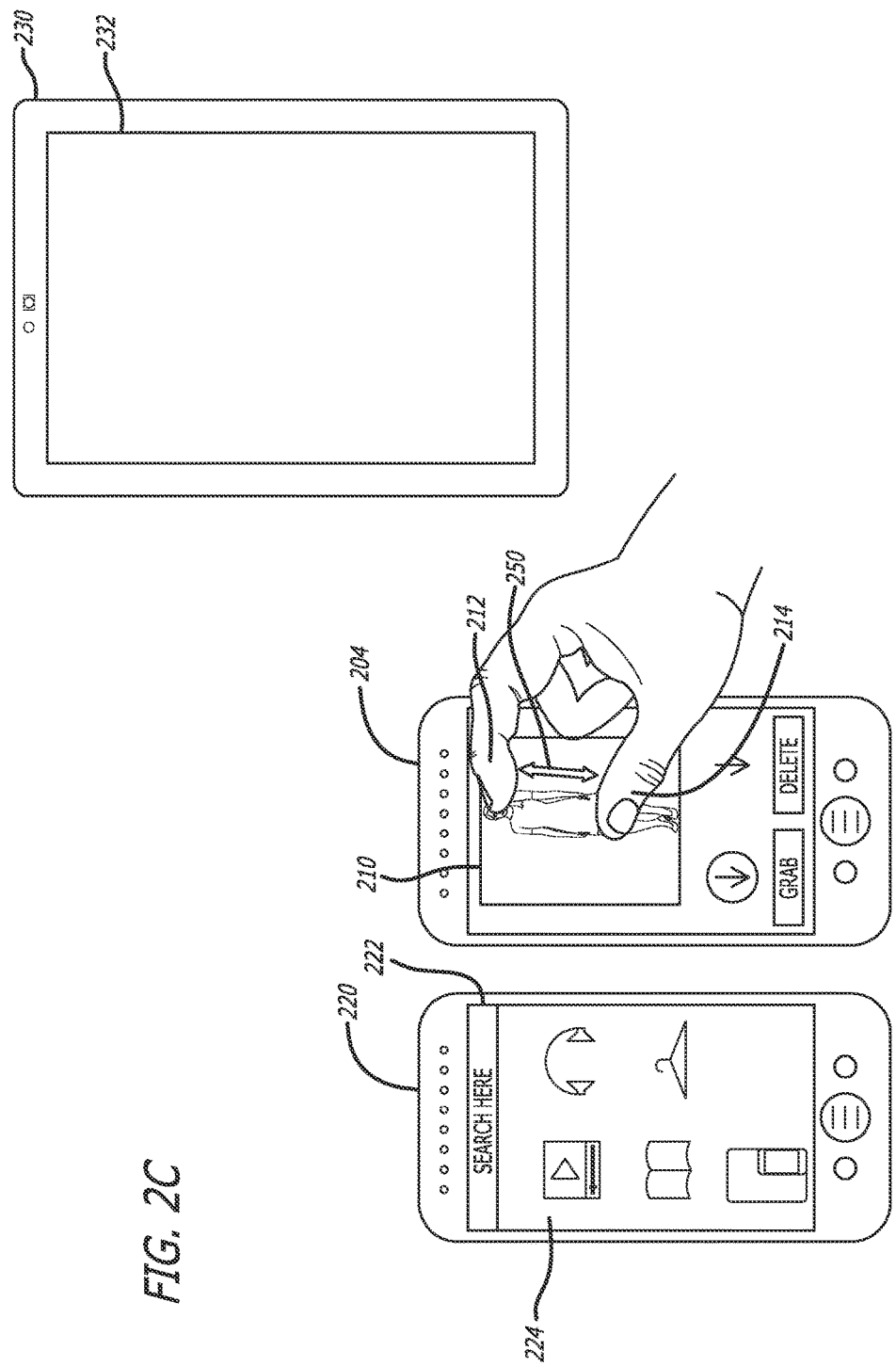

GESTURES FOR SHARING DATA BETWEEN DEVICES IN CLOSE PHYSICAL PROXIMITY

BACKGROUND

Recent years have seen drastic increases in the use of portable computing devices, such as smart phones and tablet computers. Today's consumers are utilizing such devices for a wide variety of different purposes, such as to access and search the Internet, purchase products and services, capture and/or send digital images, compose electronic mail (email) messages, make telephone calls and the like. Many of today's portable devices utilize a touch screen to receive input from users of the device. This input often takes the form of gestures made by the user's hand or fingers made while touching the screen of the device. For example, a user may make sliding motions to flip between pages or applications, pinching motions to cause the screen to zoom in or out, or tapping motions to cause the device to perform various other functions.

Users can share information electronically. For example, digital content including photographs, videos, books, etc., are shared between users. In certain situations, users may want to quickly share digital content. Even though portable computing devices utilize touch based interaction(s), these interactions may be constrained to standard mechanisms. For example, copying and/or sharing content may require custom applications and specialized interactions, which may negatively impact the user's experience.

BRIEF DESCRIPTION OF THE DRAWINGS

Various embodiments in accordance with the present disclosure will be described with reference to the drawings, in which:

FIGS. 1A, 1B and 1C illustrate an example of flinging content represented as a digital item from a first computing device to a second computing device when both devices are physically in contact with each other in accordance with various embodiments;

FIGS. 2A, 2B, 2C, and 2D illustrate an example of using a "splash" gesture that may performed by the user to send content to different devices with varying display characteristics;

DETAILED DESCRIPTION

Figure 1A:
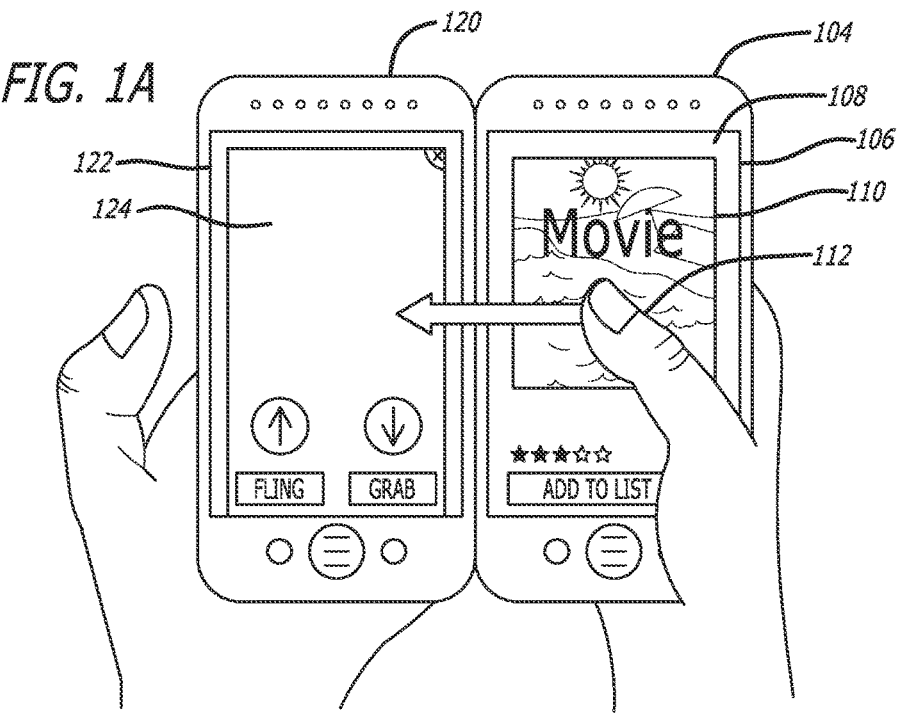

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

As used throughout this disclosure, the term "gesture" means the action being performed by the user. For example, a gesture may be a motion made by the user's hand or fingers. A gesture therefore may be a physical movement performed by the user and include one or more characteristics such as direction, pressure, duration, etc. A gesture, in some examples, include motions, such as a swipe, a flicking, a flinging, or a grabbing a portion of an interface provided for display on a display screen. In an example, a gesture may include having two proximate computing devices physically touch each other. In another example, multiple gestures may be performed.

The term "user input" refers to the data that is received or determined by the computing device when the user makes the gesture. For example, the user input may include touch screen data detected by the touch screen of the computing device when the user makes a gesture while touching the screen of the device. As used herein, an "item" may correspond to any digital product or good, multimedia, and/or other tangible or intangible item that may be offered for consumption to a user. Content on a given computing device may be represented by an item in which the item could be a graphical representation(s) (e.g., icon, image, video, etc.) of a type or category of content, including for example, a movie, music, book, apparel, or any other type of product.

Embodiments described herein provide gesture driven content sharing between computing devices with varying display characteristics. For example, sharing of content between a source device and one or more target devices can be initiated by a gesture. It is appreciated that content can be shared using a standard or proprietary communication protocol(s), wireless or radio technology, etc. In an example, a source device may be a mobile computing device with a display screen with a first set of display characteristics, a target device may be a digital television device with a display screen with a second set of display characteristics. In some examples, a second target device may be a tablet computing device with a display screen with a third set of display characteristics. Such display characteristics may include a display size, screen resolution, color depth, aspect-ratio, etc. In some examples, a type of display screen technology (e.g., CRT, LCD, LED, OLED, plasma, electrophoretic, etc.) used in a given display screen may determine at least some of the display characteristics.

A gesture performed on a touch screen display may initiate an action to be performed by an application, service, or software plugin as described further herein with respect to content (or a representation of content) shared from a device. Embodiments may be implemented as a software service that handles the delivery of information related to content for sharing between devices. For example, a "flinging" gesture for content (or a representation of content) on a device in the physical direction of proximate device can trigger information related to the content to be sent or copied to the proximate device. As used herein, "flinging" may refer to a gesture, when performed by a user, that includes a user's finger touching on the display screen (e.g., a touch screen or touch-sensitive display) of the device to initiate a selection of content provided for display, followed by a sliding or dragging motion of the finger across the display screen in a particular direction toward another proximate computing device.

Figure 1B:
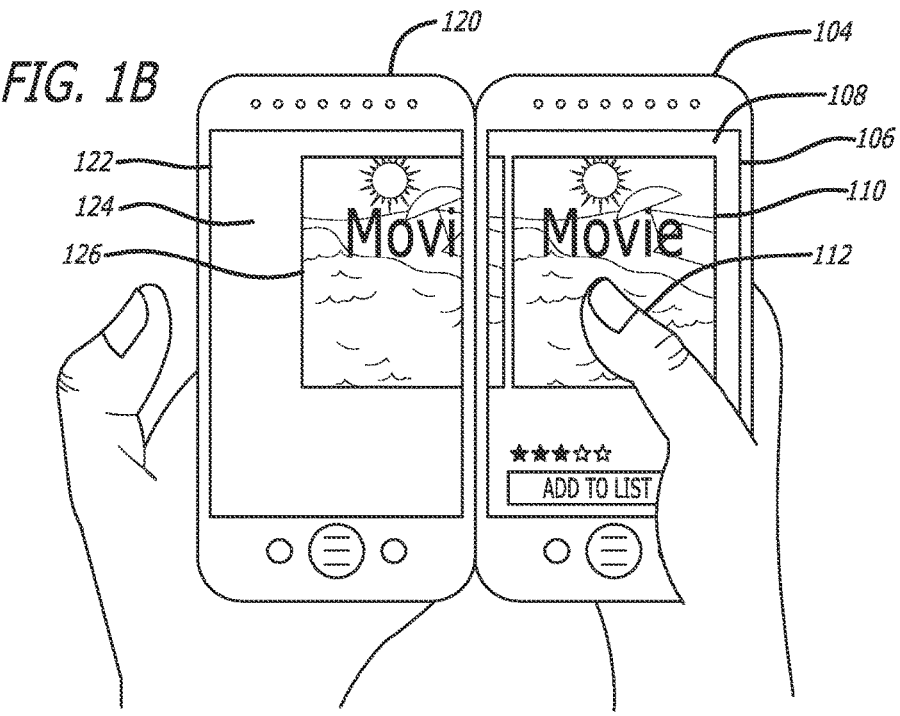

FIGS. 1A, 1B and 1C illustrate an example of flinging content represented as a digital item from a first computing device to a second computing device when both devices are physically in contact with each other. In FIG. 1A, a user is holding a computing device 104, which in this illustration, is shown to be a mobile computing device. It will be evident to one of ordinary skill in the art, that any number of other types of computing devices may be utilized in accordance with various embodiments described herein, including but not limited to mobile phones, tablet computers, electronic readers (e-readers), portable media players, personal digital assistants, laptops, wearable computing devices such as watches, glasses, visors or the like.

In the illustrated embodiment of FIG. 1A, the user is holding a second computing device 120 so that an enclosure of the second computing device 120 is physically in contact with an enclosure of the computing device 104. An enclosure may refer to an outer casing or shell that encloses and substantially surrounds the internal electrical components and other parts of a given computing device. As further illustrated, the user is making physical contact with a touch screen 106 (e.g., an initial touch contact) to select a movie item 110 that is provided in an interface 108. In this example, the movie item 110 represents movie content that may be in a local location or hosted externally at another location. The movie item 110 therefore is a graphical representation (e.g., a thumbnail, image, short animation, etc.) of the corresponding movie content. A user's finger 112 selects the item 110 in the interface 108 displayed on a touch screen 106 and performs a flinging gesture (e.g., a touch movement), along or across a plane or surface of the touch screen 106, in a direction of a second computing device 120 showing an interface 124 in a touch screen 122. In an embodiment, as part of the flinging gesture, the finger 112 may also touch the touch screen 122 (e.g., a touch contact on a different device) of the second computing device 120 in that the finger 122 is moved across the touch screen 106 and into the touch screen 122 as part of a continuous gesture motion. By touching the touch screen 122 of the second computing device 120, in an embodiment, information regarding the second computing device 120 may be received by the first computing device 104 that confirms that the movie item 110 should be shared with the second computing device 120. In an embodiment, a respective computing device may not need to be in physical contact with another device(s) to determine one or more proximate device. Instead, a distance threshold may be used to determine a proximate device(s), which may be a distance that can be traversed by the user's finger, or within some set distance, such as 1 foot, or preferably within 6 inches, or ideally within 1 inch, etc.

In an embodiment, a camera of the second computing device 120 detects the first computing device 104 and predict gestures based on the detected device. This, in an example, may be accomplished by detecting an outline and/or a shape of the first computing device 104. Other techniques may be used. A three-dimensional (3D) map of the skeleton of the user may be generated by using a depth camera and a model of where the user is looking (e.g., an eye gaze direction) may then be predicted. In an embodiment, a ray tracing technique using incident light from a camera flash (from an LED, IR emitter, or other light source) of the first computing device 104 and referencing the ray traced light with respect to the view from the camera flash may be used to predict a direction where the user was looking through the camera. Further, a digital zoom of the camera may also be used for predicting gestures.

In at least an embodiment, a publisher-subscriber model may be used for implementing the sharing of content as described herein. For example, information for the gesture, including input data indicating the direction of the gesture and the selected movie item 110, may be received by an input listener running on the first computing device 104 and then forwarded to the background application. The background application may then publish the data by forwarding it to a content sharing service, which may then send the published data to one or more subscriber applications based at least in part on the information included in the published data (e.g., the direction of the gesture for instance that corresponds to a position of a respective proximate computing device). Further, in response to receiving user input on the touch screen of the second computing device 120 as part of the continuous gesture as described above, the second computing device 120 may publish information corresponding to the position of the touch input on the touch screen of the second computing device. The device application running on the first computing device, as a subscriber of information from the second computing device, may receive this information from the second computing device. The information may be used to confirm that the selected movie item 110 is to be shared with the second computing device 120.

In FIG. 1B, in response to the flinging gesture, the item 110 is graphically represented as being sent to the second computing device 120 by being partially displayed as a movie item 126 in the interface 124 to depict the transfers from the computing device 104. Sending the item 110 may be graphically depicted using an image or animation showing that the item 110 is moving in the direction of the second computing device as a result of the flinging gesture. In FIG. 1C, the movie item 126 is fully displayed in the interface 124 of the second computing device 120 after being transferred from the computing device 104.

As discussed above, information for the gesture from the computing device 104, including input data indicating the direction of the gesture and the selected movie item 110, may be received by the input listener and forwarded to the background application. The background application may publish the data by forwarding it to the content sharing service, which includes additional metadata into the published data identifying a location of external content (e.g., a video of a trailer) corresponding to the movie item 110, and sends the published data to a subscriber application running on the computing device 120. The subscriber application on the computing device 120 receives this published data and determines a manner and location for displaying and positioning a representation of content corresponding to the initially shared movie item 110. In this example, the movie item 126 is provided for display on the computing device 120 that represents the shared movie item 110 from the computing device 104.

Figure 1D:
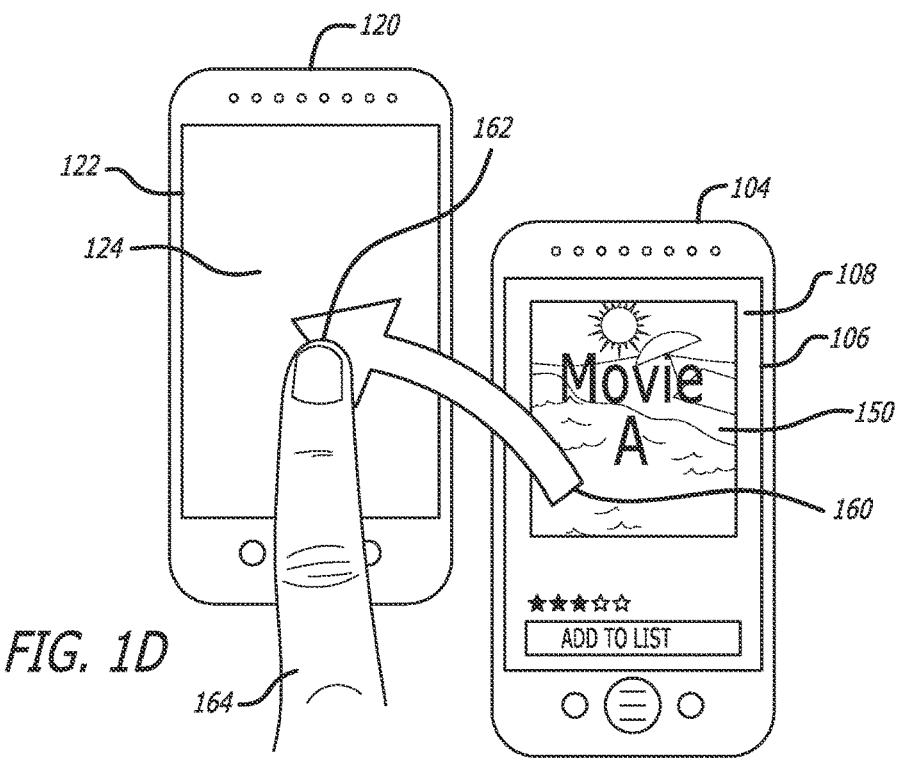
FIGS. 1D and 1E illustrate of an example of flinging content from a first computing device to a second computing device when the devices are offset, with respect to relative positions of each device, from each other in accordance with various embodiments.

FIG. 1D illustrates an example of flinging content from one computing device to a second computing in a scenario in which the computing devices are offset in position from each other. In this example, the computing device 104 is positioned at a position that is offset from the computing device 120. A gesture is performed with a user's finger 164 starting at an initial touch position 160 on the touch screen 106 and continued across the touch screen 122 of the second computing device 120 and stops at a second touch position 162 in an interface 124. As illustrated, the gesture includes a curved path for the user's finger 164. Using the second touch position 162, it may be determined that a movie item 150 is to be shared with the second computing device 120.

Figure 1E:
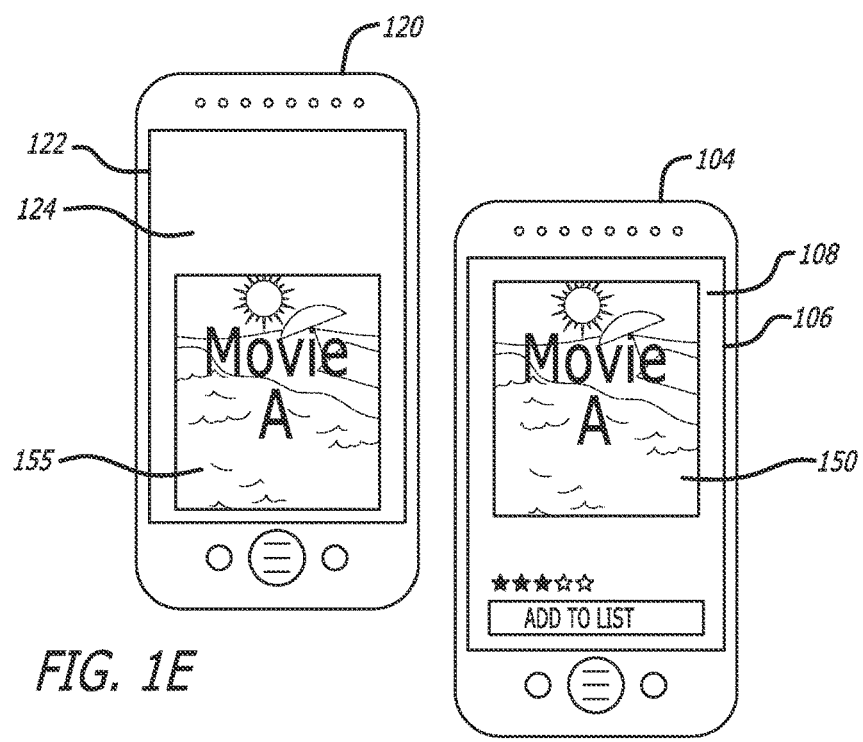

FIG. 1E illustrates an example in which a movie item 155 is provided for display on the touch screen of the second computing device 120. The position of the movie item 155 is based on the second touch position 162 described above. Since the positions of the two computing devices are offset in this example, the ending position of the gesture corresponds to a different position of the interface 124 when compared to the position of the movie item 150 shown in the interface 108 in the first computing device 104.

Figure 1F:
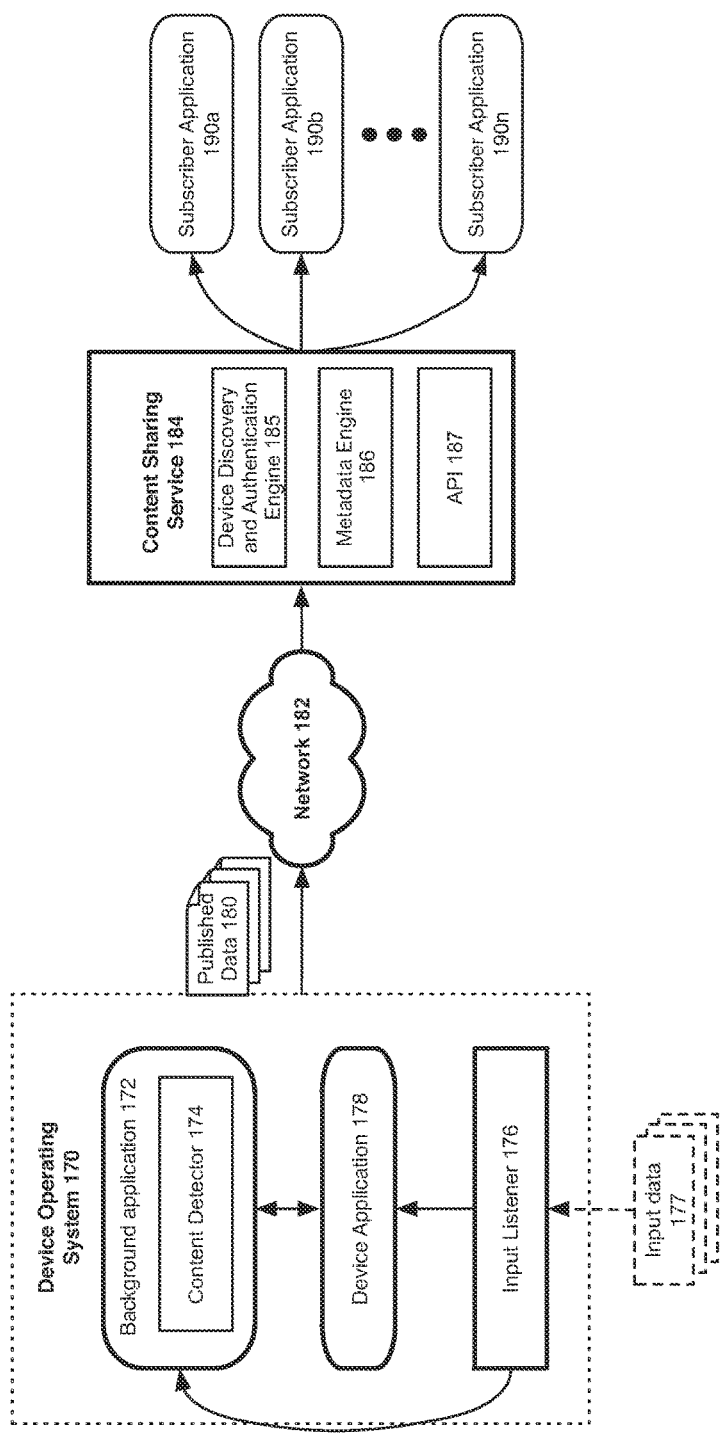
FIG. 1F illustrates an example computing environment including components for implementing aspects of the disclosure.

FIG. 1F illustrates an example computing environment including components for implementing aspects of the disclosure. The example computing environment, in an embodiment, include a device operating system 170 executing on a computing device. A background application 172 may be executing within the device operating system 170. The background application 172 may include a content detector 174, and an input listener 176. The device operating system 170 may include an input listener 176, which may be a software component running on the device operating system 170 that detects input events corresponding to various input data (e.g., gesture or touch-input, mouse-clicks or movement, keyboard-input, etc.), and may forward information for the input data to another application that has requested to receive the input data. In an embodiment, the background application 172 may request to receive information for input events that are detected by the input listener 176. The background application 172, for example, may provide to the input listener 176 information for defining a gesture that the input listener should detect. For example, a gesture, as defined by the background application 172, may include a combination of one or more input events (e.g., when a user first places a finger on a touch-sensitive display, when the user moves the finger around, when the user raises the finger off of the touch-sensitive display, etc.). Input events therefore may processed by the input listener 176 and interpreted as corresponding to the gesture by using the information that defined the gesture Information for content can be requested by the device application 178, and then provided by the content detector 174 to the device application 178. For example, the content detector 174 may determine content for sharing by identifying representations of content or parsing links to content on a web page, scanning content in a folder or directory or location provided in local (e.g., on the device) or remote (e.g., in the cloud) storage, and/or as provided or hosted in an external site, data source, or repository (e.g., electronic marketplace, content provider, etc.). A determination of the type of content can further be made. In an example, a link to the content may provide information that indicates the type of content, and in another example, a portion of the file name (e.g., extension) may indicate the type of content. In yet another example, metadata information provided in the web page, or stored locally or remotely may be used to determine the type of content.

The input listener 176, as a software component running on the device operating system 170, may listen to one or more input events 177 received by the device operating system 170. Such user input events may include input data corresponding keyboard input, mouse input, and/or touch or gesture input. Touch or gesture input may include data for touch, swipe, and direction of the swipe, velocity, position, among other input data. In an example, the input listener 176 may receive input data 127 and forward information for the input data 127 to a device application 178 running on the operating system. The device application 178 may be a mobile device app, a web browser, thin client, among other types of applications. As further shown, the input listener 176 may forward information for the input data 177 to the background application 172.

In an embodiment, the background application 172 serves as a publisher of data, messages, or information to one or more subscriber applications. A publisher application publishes information, and one or more subscriber applications request and use the information. In an embodiment, a quanta of information suitable for publishing is referred to as an event. The publisher application therefore publishes events and subscriber applications can subscribe to events that match criteria or attributes as defined by the respective subscriber application(s). In an example, a publisher application (e.g., the background application 172) can communicate to one or more subscriber applications according to a topic (e.g., a logical grouping) or based on criteria including attributes or content. Each subscriber application can receive events published by the background application 172 if the event matches the criteria specified by the subscriber.

The background application 172 may send published data 180 (e.g., including one or more events) over a network 182 to a content sharing service 184. The content sharing service 184 acts as a middleware system or server that connects the publisher to subscribers. The content sharing service 184 receives published event(s) in the form of the published data 180 from the background application 172 and sends the event(s) to each of the subscribers. It is appreciated that, under this implementation, the publisher and subscribers do not need to have direct knowledge about each other to communicate.

In an embodiment, the content sharing service 184 is implemented as a Web service that supports a programmatic interaction with the content sharing service 184 (e.g., to exchange information) by exposing one or more defined APIs ("application program interfaces"). As a Web service, the content sharing service 184 enables different applications and different computing devices to interact, and may be implemented using various underlying protocols and techniques. For example, some Web service implementations return data in XML ("extensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

The content sharing service 184 includes an API 187 for publishers and for subscribers. The API 187 defines one or more procedures that allow respective publishers and subscribers to interface with the content sharing service 184.

Thus, different publishers and subscribers can be connected to the content sharing service 184, when using the procedures defined by the API.

A device discovery and authentication engine 185 may perform operations to discover one or more devices that are in proximity to the computing device hosting the device operating system 170. In an example, a location of a computing device in proximity may be determined using one or more techniques including GPS signals, a Wi-Fi network in which the computing device is connected to, a specified location of the computing device, etc. The location of a proximate computing device may also include a relative position of the proximate computing device to computing device running the device operating system 170 with the background application 172. Once discovered, a respective proximate device may be authenticated by the device discovery and authentication engine 185 using an authentication technique (e.g., device ID, username and password, PIN, MAC address, unique key or string, etc.).

In the example of FIG. 1F, the device discovery and authentication engine 185 may determine that a subscriber application 190*a*, a subscriber application 190*b*, and a subscriber application 190*n* are all located within the proximity of the computing device running the background application 172. Each subscriber application (e.g., web browser, web application, mobile device application, desktop application, thin client, etc.) may be running on a respective computing device (not illustrated in FIG. 1F).

As mentioned before, the published data 180 is sent from the background application 172, which may include information for events (e.g., information corresponding to a flinging gesture selecting a representation of content displayed on the computing device, information corresponding to a direction of the flinging gesture, information corresponding to the selected content, etc.) A metadata engine 186 may determine additional information for including in the published data 180. For example, the metadata engine 186 may obtain (e.g., by requesting from an external source) metadata information for describing the selected content indicated in the published data 180, and include this metadata information with published data 180 that will be sent to each of the subscriber applications. The metadata information, for example, may include a location or URL of the selected content, among other types of information.

Figure 2A:
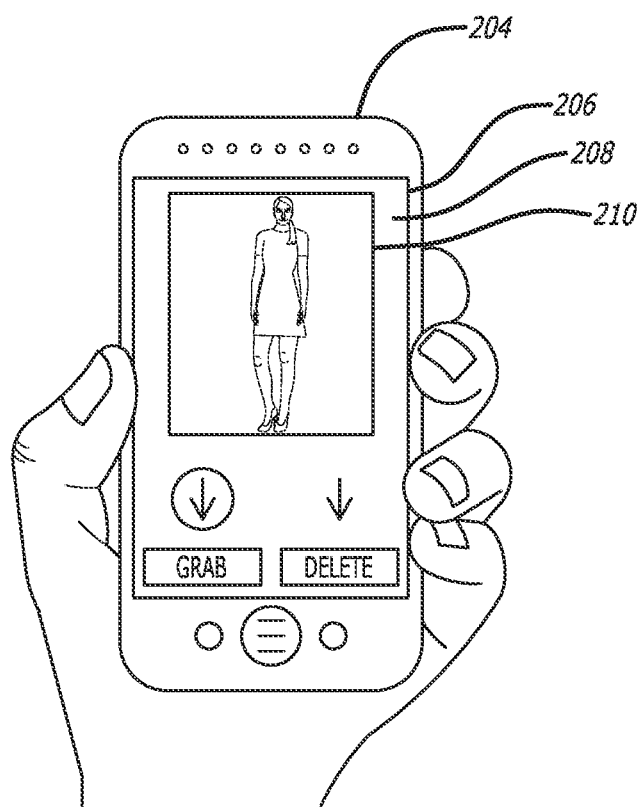

FIGS. 2A, 2B, 2C, and 2D illustrate an example of using a "splash" gesture that may performed by the user to send content to different devices with varying display characteristics. The splash gesture may be a multi-touch gesture where two fingers are used to follow a trajectory or pattern when both fingers are in contact with a touch screen. As used herein, the splash gesture occurs when a user places two fingers in physical contact with a touch screen (e.g., respective touch contacts at respective position on the touch screen) and then moves the fingers apart (e.g., in respective directions that are away from each other) while keeping the fingers in contact with the touch screen. In FIG. 2A, a user is holding a user is holding a computing device 204 with a touch screen 206. An interface 208 shows a clothing item 210 that represents an article of apparel (e.g., a dress).

Figure 2B:
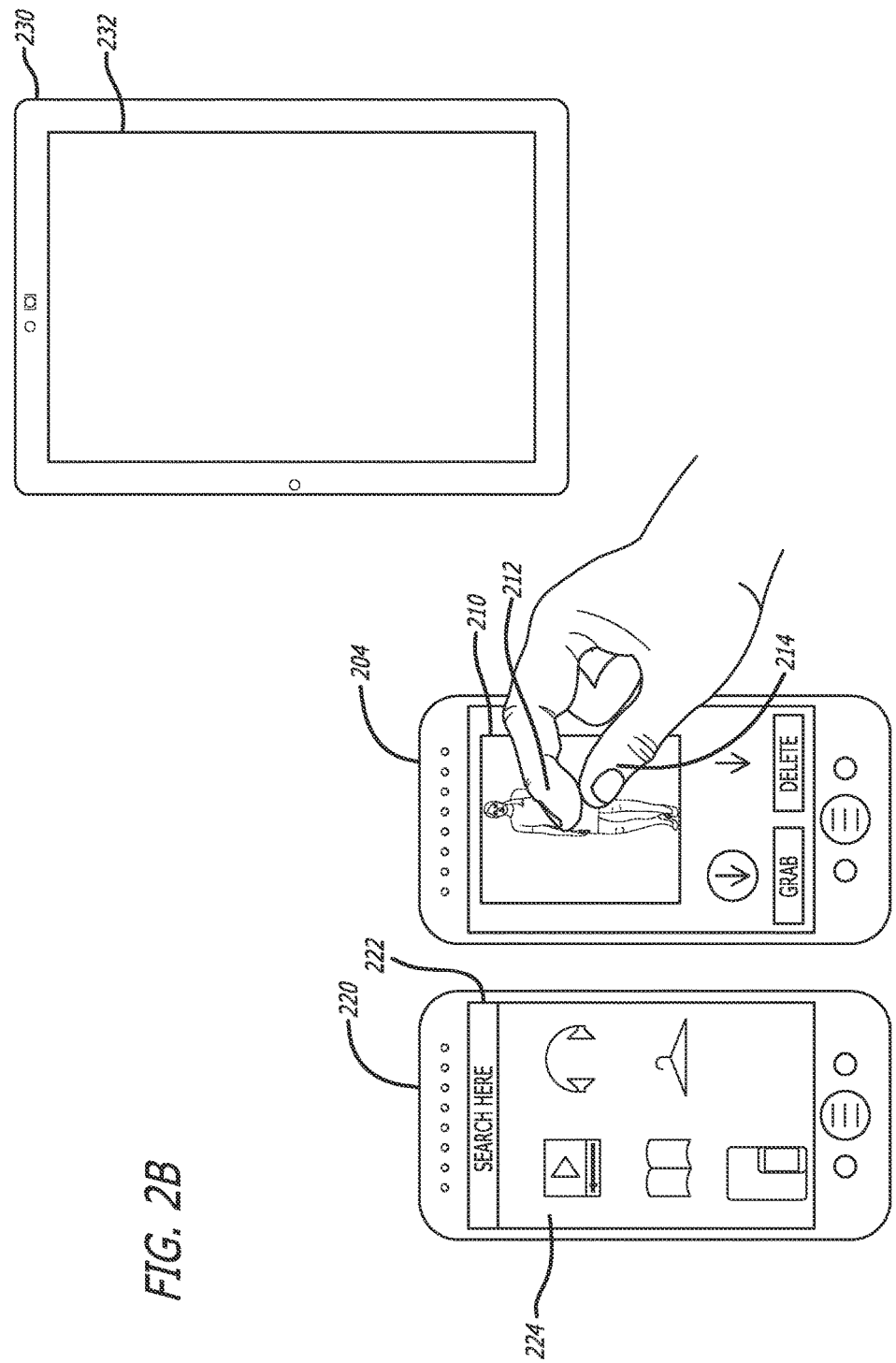

As illustrated in FIG. 2B, the user selects the clothing item 210 using finger 212 and finger 214 placed in physical contact with the touch screen of the computing device 204. As further shown, a second computing device 220, with a display screen 222 showing an interface 224, and a third computing device 230, with a display screen 232, are within proximity of the computing device 204.

In FIG. 2C, the user performs a splash gesture 250 by moving the finger 212 and the finger 214 apart while maintaining physical contact with the touch screen. In an embodiment, the computing device 204 may detect or identity one or more proximate computing devices using location information associated with the proximate computing device, e.g., GPS, NFC or BLUETOOTH data. In this example, the computing device 204 detects that the second computing device 220 and the third computing device 230 are proximate to the computing device 204. The display screen 222 of second computing device 220 may have different display characteristics than the display characteristics of the touch screen of the computing device 204. Further, the display screen 232 of the third computing device 230, with its larger screen size, may have different display characteristics with respect to the other display screens.

By reference to FIG. 1F for illustrating backend operations performed in accordance with at least an embodiment, information for the splash gesture, including input data indicating the direction of the gesture and the selected clothing item 210, may be received by the input listener 176 and then the input listener 176 may forward information for the input data to the background application 172. The background application 172 may then publish the data by forwarding it to the content sharing service 184, which may then send the published data to one or more subscriber applications running on proximate devices based at least in part on the information included in the published data (e.g., information indicating a splash gesture for sharing content to multiple proximate devices). Although the above example discusses an example with a single computing device, it is appreciated that other devices may also communicate with a content sharing service using similar components running on the device (e.g., using a respective input listener, background application, and/or device application).

Figure 2D:
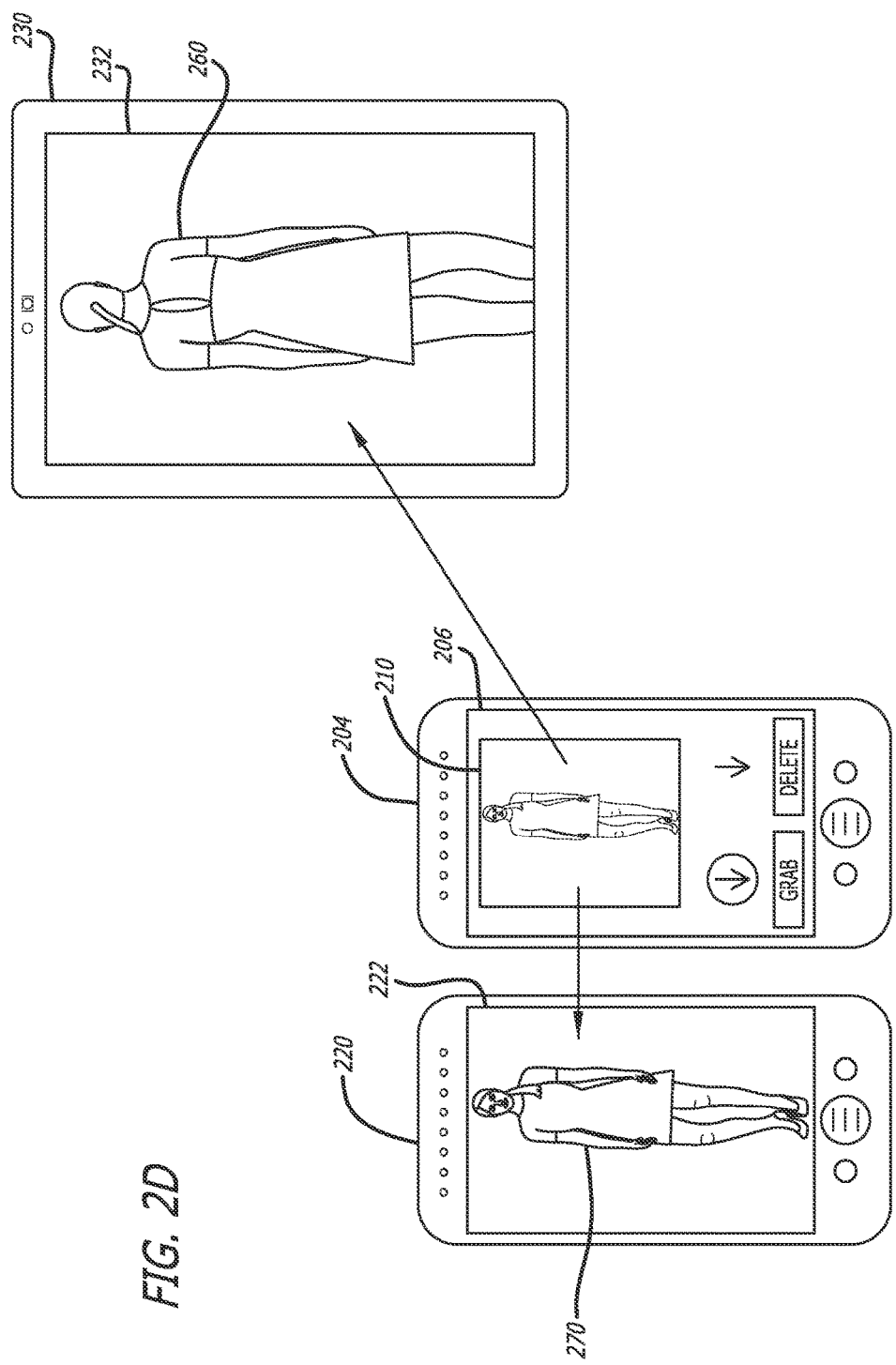

After performing the splash gesture, as shown in FIG. 2D, a clothing item 270 is shown in the display screen 222 of the second computing device 220, and a clothing item 260 is shown in the display screen 232 of the third computing device 230. In this example, the clothing item 260 may be displayed using a different image (e.g., the back view) of the corresponding article of apparel.

Again, by reference to FIG. 1F for illustrating backend operations performed in accordance with at least an embodiment, information for the selected clothing item 210 received in the published information from the content sharing service 134, may be processed by respective subscriber applications running on the second computing device 220 and the third computing device 230. Based at least in part on respective display characteristics of the computing device and/or published information, each computing device may select a different graphical representation of the originally shared clothing item 210 to display. However, it is appreciated that in at least one embodiment, the graphical representation of the shared item may be the same as displayed in the first computing device 204.

Figure 3:
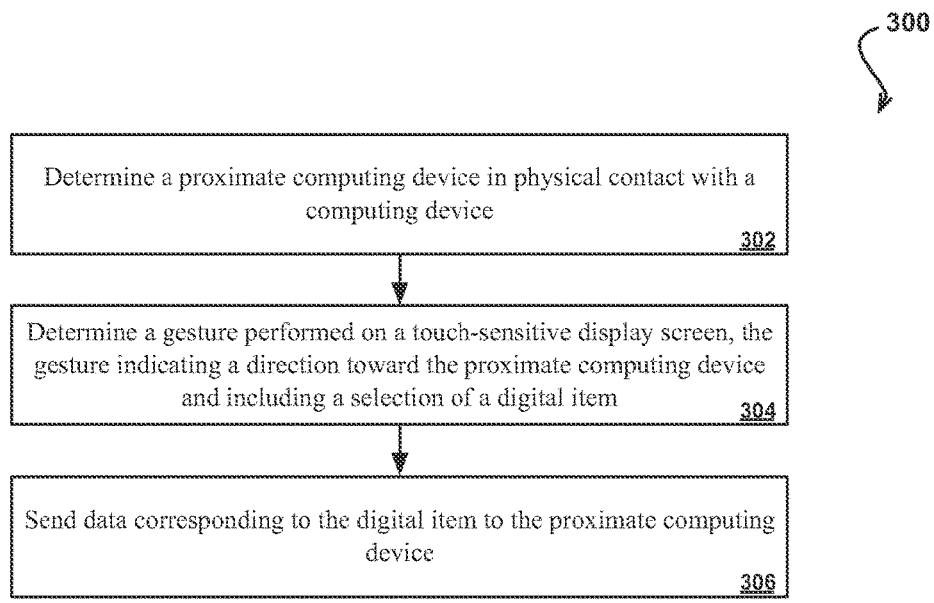
FIG. 3 illustrates an example process 300 for sending data corresponding to a digital item to a proximate computing device, while in physical contact with a first computing device, that can be used in accordance with various embodiments.

FIG. 3 illustrates an example process 300 for sending data corresponding to a digital item to a proximate computing device, while in physical contact with a first computing device, that can be used in accordance with various embodiments. Although this figure, as well as other process illustrations contained in this disclosure may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Further-more, it is to be understood that certain steps or sequences of steps can be added to or omitted from the process, without departing from the scope of the various embodiments. The process 300 may be implemented by one or more computing devices or systems in some embodiments.

At step 302, a proximate computing device in physical contact with a computing device is determined. In an example, at least a portion of an enclosure of the proximate computing device is substantially adjacent to at least a portion of an enclosure of the computing device. At step 304, a gesture performed on a touch-sensitive display screen is determined, the gesture indicating a direction toward the proximate computing device and including a selection of a digital item. At step 306, data corresponding to the digital item is sent to the proximate computing device.

Figure 4:
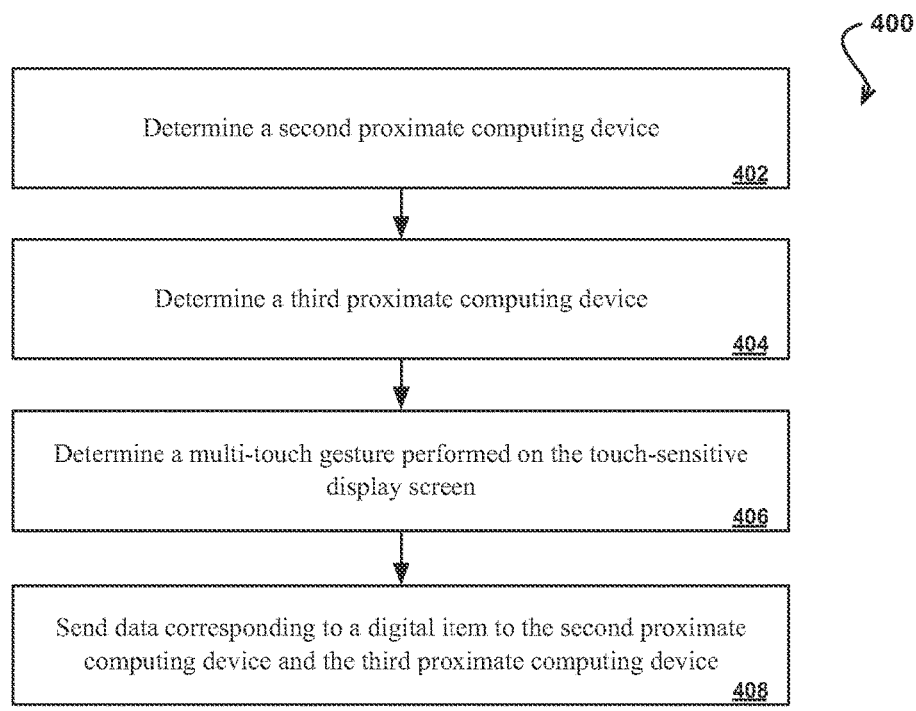
FIG. 4 illustrates an example process for using a multi-touch gesture for sending data corresponding to a digital item to multiple proximate computing devices by, that can be used in accordance with various embodiments.

FIG. 4 illustrates an example process for using a multi-touch gesture for sending data corresponding to a digital item to multiple proximate computing devices by, that can be used in accordance with various embodiments. The process 400 may be implemented by one or more computing devices or systems in some embodiments.

At step 402, a second proximate computing device is determined. At step 404, a third proximate computing device is determined. At step 406, a multi-touch gesture performed on the touch-sensitive display screen is determined, the multi-touch gesture comprising at least a selection of a representation of a digital item and including two contact positions moving apart from each of the two contact positions. At step 408, data corresponding to the digital item is sent to the second proximate computing device and the third proximate computing device. In an example, the representation of the digital item includes at least one of an image, text, audio, or video, and the digital item is associated with a category corresponding to movies, music, books, or apparel. A set of display characteristics of a display screen of the second proximate computing device may be different than a set of display characteristics of a display screen of the third proximate computing device. Further, after the data is sent, a second representation of the digital item is displayed on the display screen of the second proximate computing device and a third representation of the digital item is displayed on the display screen of the third proximate computing device. The second representation and the third representation are different depictions of the digital item in an embodiment.

Figures 5A, 5B:
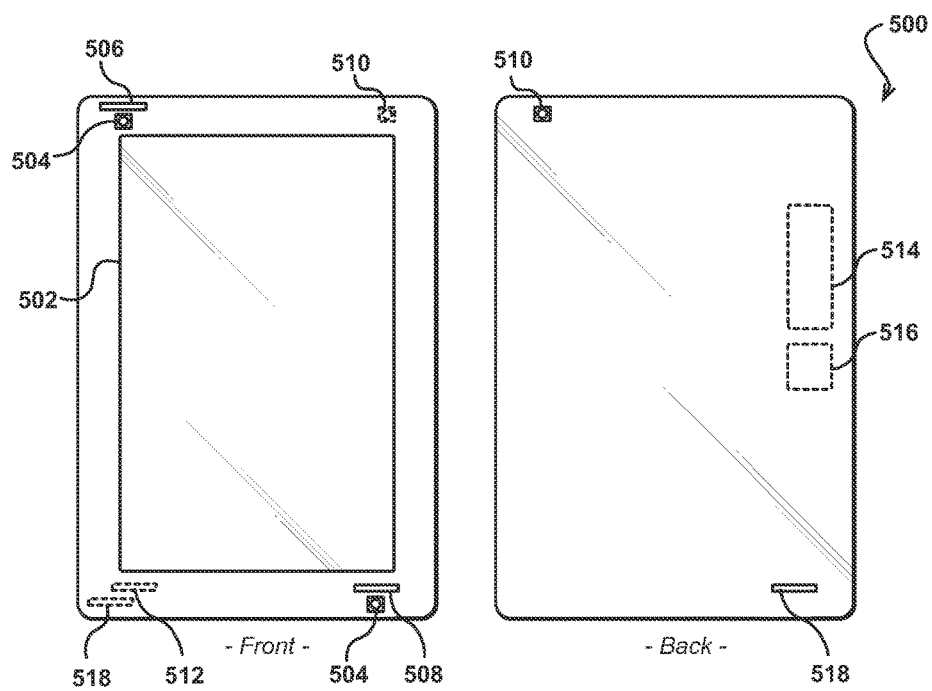
FIGS. 5A and 5B illustrate front and back views, respectively, of an example electronic computing device that can be used in accordance with various embodiments.

FIGS. 5A and 5B illustrate front and back views, respectively, of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one computing mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
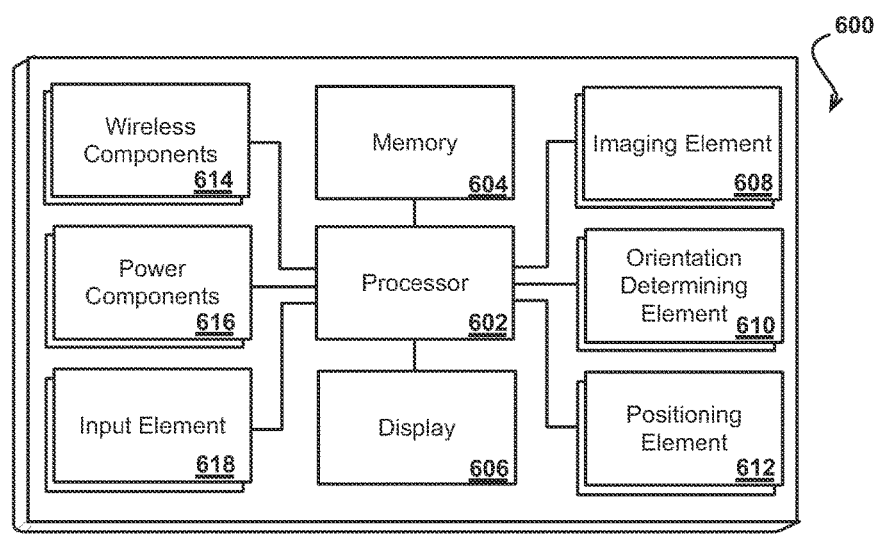
FIG. 6 illustrates a set of basic components of an electronic computing device such as the device described with respect to FIGS. 6A and 6B.

FIG. 6 illustrates a set of basic components of an electronic computing device 600 such as the device 500 described with respect to FIGS. 5A and 5B. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of computing approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 7:
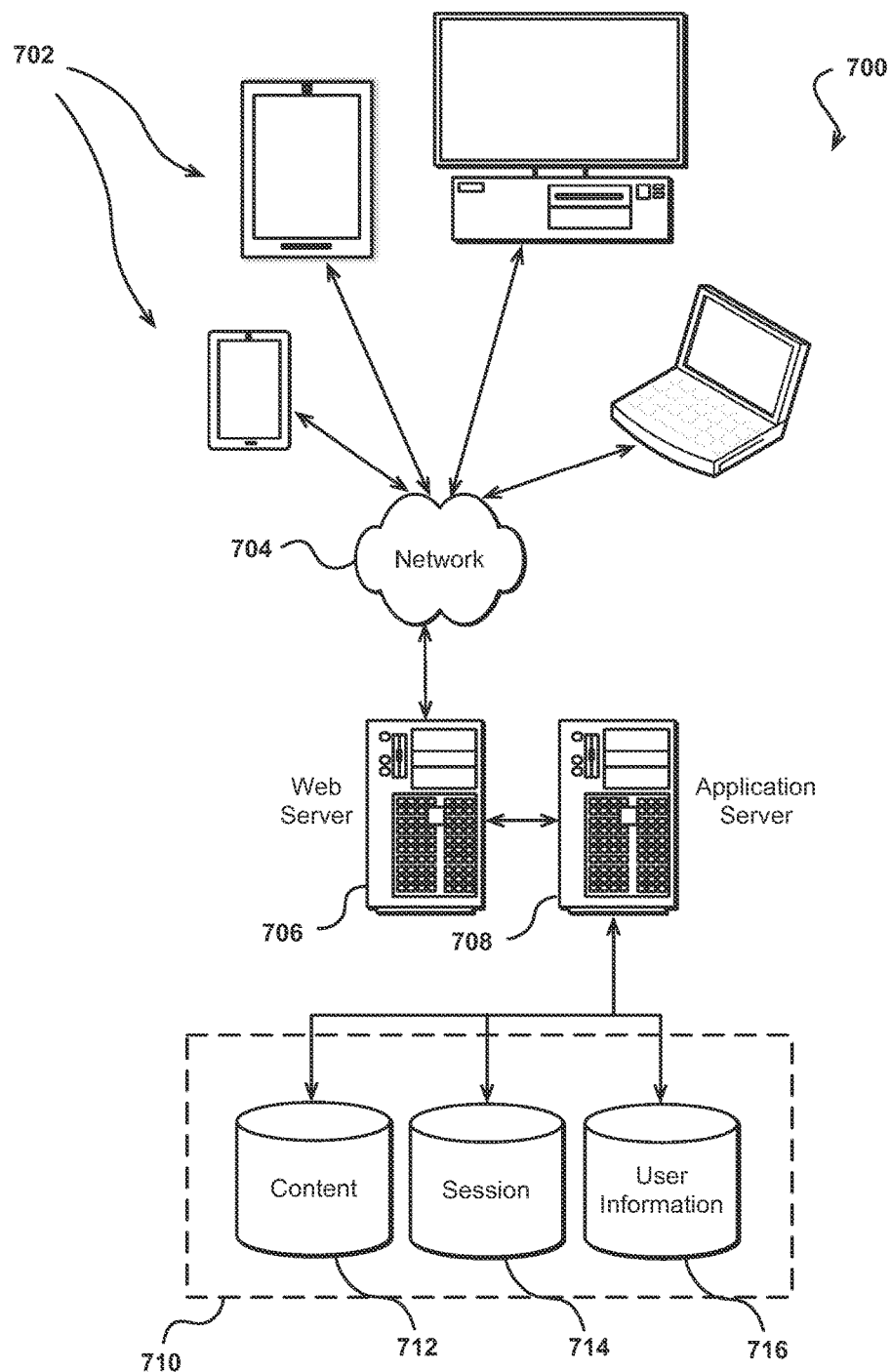
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
   at least one processor;
   a touch-sensitive display screen;
   an enclosure; and
   a memory device including instructions that, when executed by the at least one processor, cause the at least one processor to:
      determine a first device is registered with a content sharing service and is within a distance threshold relative to the computing device, the distance threshold comprising a set distance;
      determine a multi-touch gesture performed on the touch-sensitive display screen and at least a portion of the first device, the multi-touch gesture comprising at least a selection of a representation of a digital item, an initial touch position from contact with the touch-sensitive display screen, a terminal position from contact with the portion of the first device, and a touch movement between the initial touch position and the terminal position; and
      publish data corresponding to the digital item to the content sharing service for distribution to the first device within the distance threshold based on the multi-touch gesture.

2. The computing device of claim 1, wherein the computing device displays the representation of the digital item based on a first set of display characteristics, wherein the first device displays a second representation of the digital item based on a second set of display characteristics different than the first set of display characteristics.

3. A computer-implemented method comprising:
   determining a first device is registered with a content sharing service and is within a distance threshold of a computing device, the distance threshold comprising a set distance;
   determining a multi-touch gesture performed on a touch-sensitive display screen and at least a portion of the first device, the multi-touch gesture comprising at least a selection of a representation of a digital item, an initial touch position from contact with the computing device, a terminal touch position from contact with the first computing device, and a touch movement between the initial touch position and the terminal touch position; and
   publishing data corresponding to the digital item to the content sharing service for distribution to the first device within the distance threshold based on the multi-touch gesture.

4. The computer-implemented method of claim 3, wherein the initial touch position and the terminal touch position correspond to contact by fingers of a user, including at least one of a thumb, an index finger, or a middle finger.

5. The computer-implemented method of claim 3, wherein the computing device displays the representation of the digital item based on a first set of display characteristics, wherein the first device displays a second representation of the digital item based on a second set of display characteristics different than the first set of display characteristics.

6. The computer-implemented method of claim 5, wherein the first representation and the second representation are different depictions of the digital item.

7. A non-transitory computer-readable medium including instructions stored therein that, when executed by at least one computing device, cause the at least one computing device to:
   determine a first device is registered with to a content sharing service and is within a distance threshold of the at least one computing device, the distance threshold comprising a distance defined by a reach of a user;
   determine a multi-touch gesture performed on a touch-sensitive display screen and at least a portion of the first device, the multi-touch gesture comprising at least a selection of a representation of a digital item, an initial touch position from contact with the touch-sensitive display screen, a terminal touch position from contact with the portion of the first device, and a touch movement between the initial touch position and the terminal touch position; and
   publish data corresponding to the digital item to the content sharing service for distribution to the first device within the distance threshold based on the multi-touch gesture.

8. The non-transitory computer-readable medium of claim 7, wherein the computing device displays the representation of the digital item based on a first set of display characteristics, wherein the first device is associated with a second set of display characteristics different than the first set of display characteristics.

9. The non-transitory computer-readable medium of claim 8, wherein the first representation and the second representation are different depictions of the digital item.

10. The computing device of claim 1, wherein the instructions, when executed by the at least one processor, further cause the at least one processor to:
   detect the first device using location information associated with the first device and location information associated with the computing device.

11. The computer-implemented method of claim 3, wherein at least a portion of an enclosure of the computing device is substantially adjacent to at least a portion of an enclosure of the first device.

12. The computer-implemented method of claim 3, wherein the digital item is associated with a category corresponding to movies, music, books, or apparel.

13. The computer-implemented method of claim 3, wherein the data corresponding to the digital item further includes metadata that indicates a location of the digital item.

14. The non-transitory computer-readable medium of claim 7, wherein at least a portion of an enclosure of the at least one computing device is substantially adjacent to at least a portion of an enclosure of the first device.

15. The non-transitory computer-readable medium of claim 7, wherein the digital item is associated with a category corresponding to movies, music, books, or apparel.

16. The non-transitory computer-readable medium of claim 7, wherein the data corresponding to the digital item further includes metadata that indicates a location of the digital item.

* * * * *